Sept. 15, 1953 R. O. VARNUM 2,652,263
WHEEL TILTING MECHANISM FOR AUTOMOBILES
Filed June 14, 1950 4 Sheets-Sheet 4

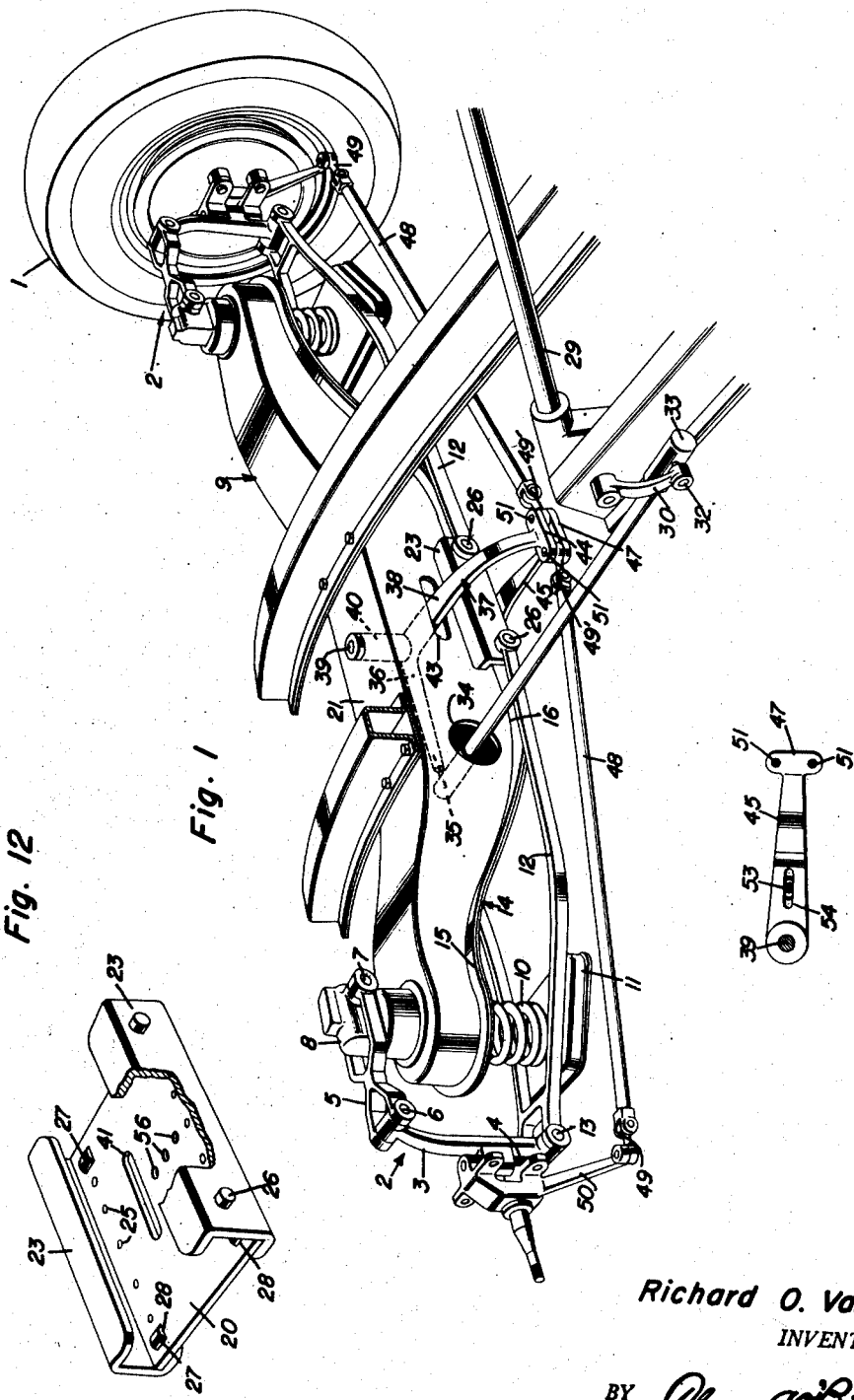

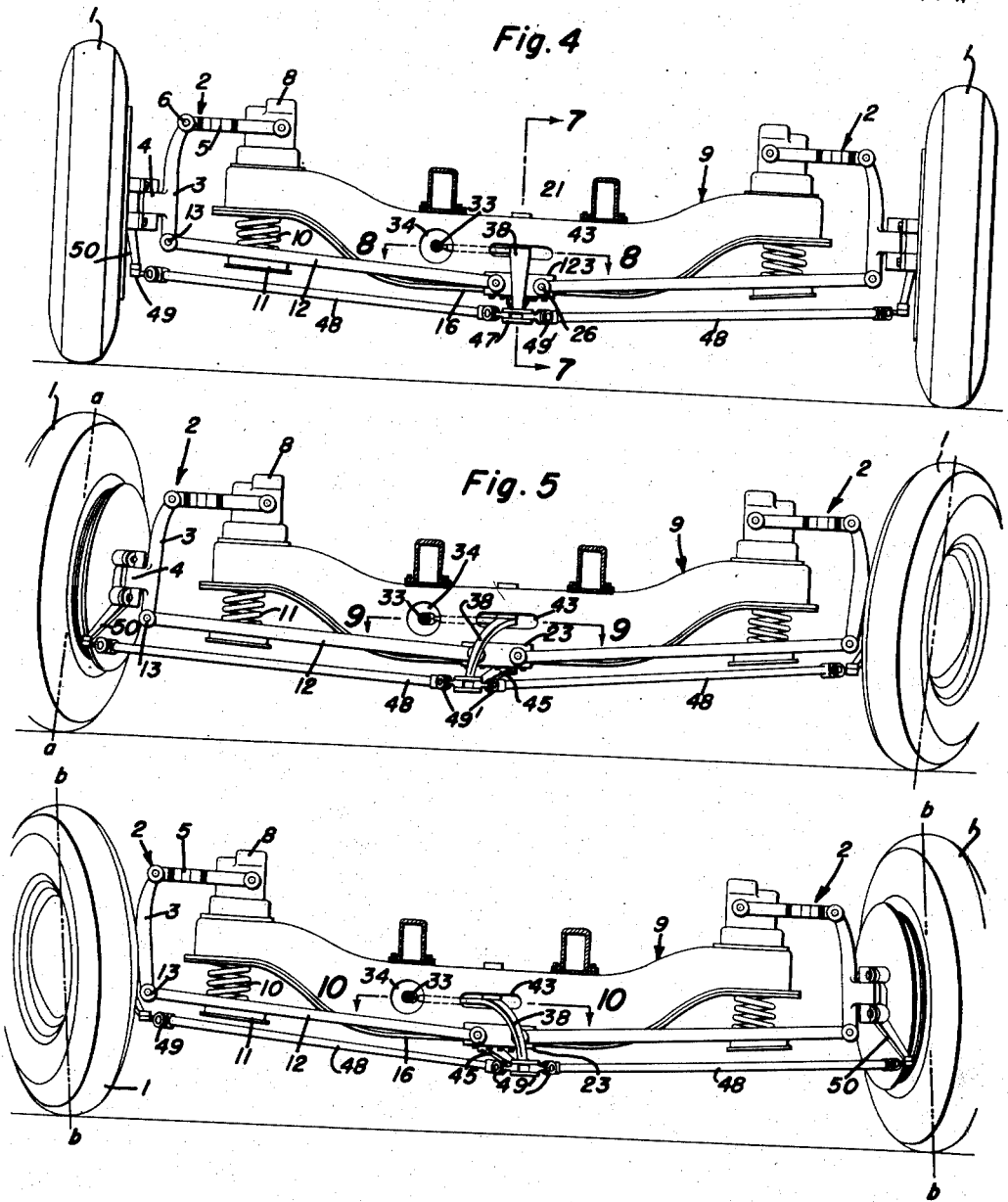

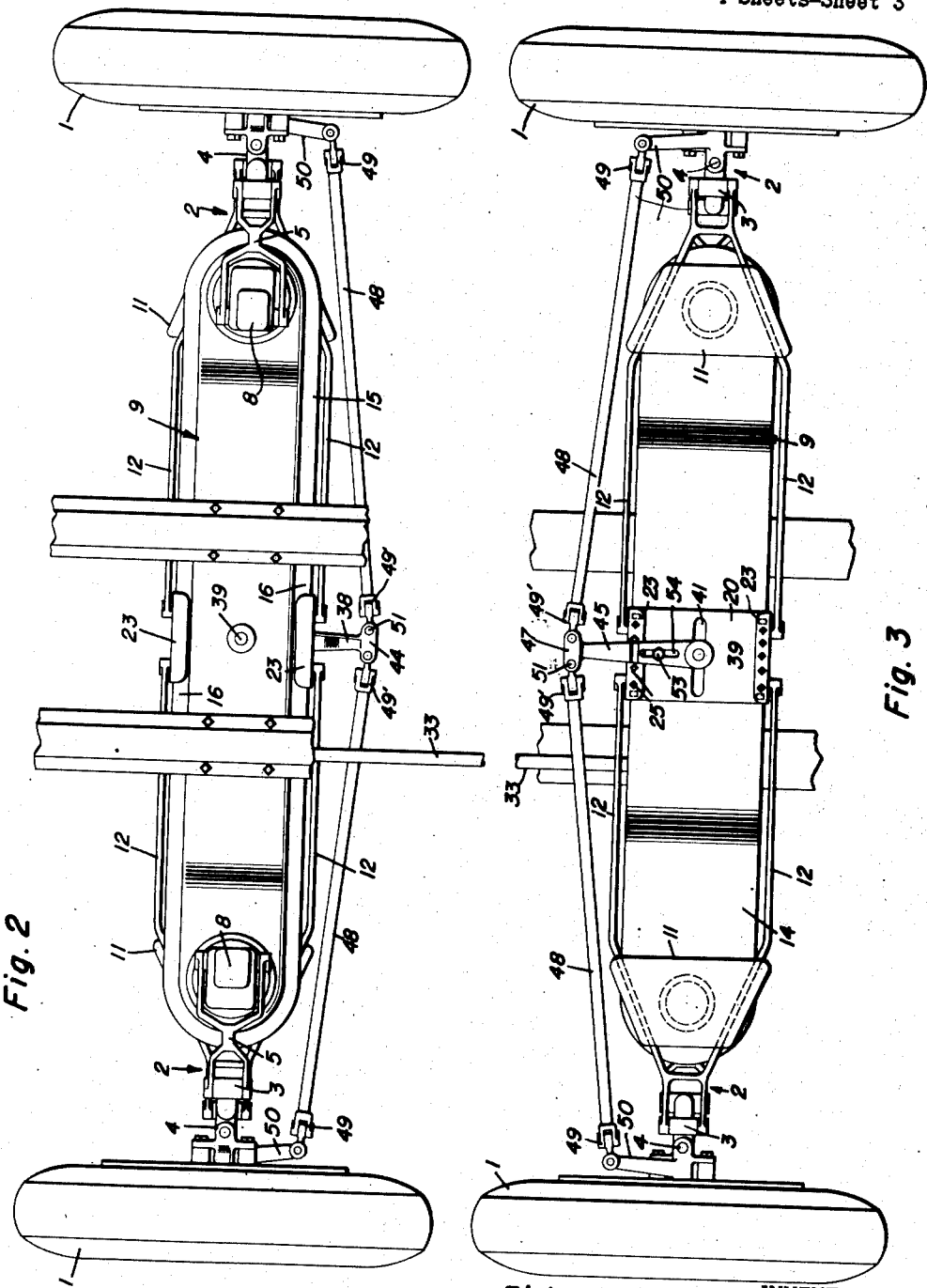

Richard O. Varnum
INVENTOR.

BY
Attorneys

Patented Sept. 15, 1953

2,652,263

UNITED STATES PATENT OFFICE 2,652,263

WHEEL TILTING MECHANISM FOR AUTOMOBILES

Richard O. Varnum, Fort Klamath, Oreg.

Application June 14, 1950, Serial No. 167,989

4 Claims. (Cl. 280—95)

My invention relates to improvements in wheel tilting mechanism for the steerable wheels of automobiles, and similar vehicles.

As is well known, the front steerable wheels of automobiles on the conventional independent, or "knee action" wheel suspensions tend, under the action of centrifugal force in rounding a curve, to tilt or lean vertically oppositely relative to the direction in which the automobile is turning. This leaning, or tiling, causes the tire to squeel, wear excessively and out of shape, and increases the tendency of the tires to skid, especially on slippery roads.

Having the foregoing in mind, the primary object of my invention is to provide simply constructed, inexpensive mechanism for adjusting such independent wheel mountings concurrently with steering to tilt the steerable wheels vertically in the direction in which the automobile is turning, and thereby obviate the above-mentioned disadvantages resulting from tilting, or leaning, of the wheels vertically in the opposite direction.

A further object is to provide mechanism for the above purpose which will not prohibitively increase the cost of manufacture of automobiles and is easy to service.

Other and subordinate objects, within the purview of my invention, together with the precise nature of my improvements, and the advantages thereof, will become clear when the succeeding description and claims are read with reference to the drawings accompanying and forming part of this specification.

In said drawings:

Figure 1 is a fragmentary view in perspective of my improved wheel tilting mechanism in the preferred embodiment thereof;

Figure 2 is a fragmentary view in plan;

Figure 3 is a view in bottom plan of the same;

Figure 4 is a view in rear elevation drawn to a smaller scale;

Figure 5 is a similar view illustrating the mechanism positioned for tilting the wheels while making a right turn;

Figure 6 is a similar view illustrating the mechanism positioned for tilting the wheels while making a left turn;

Figure 11 is a view in horizontal section taken on the line 11—11 of Figure 7; and Figure 12 is a view in perspective of the coupling plate.

Figure 8:
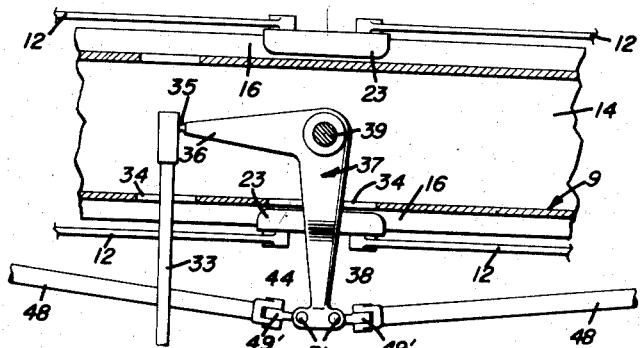
Figure 8 is a fragmentary view in horizontal section taken on the line 8—8 of Figure 4 and drawn to a larger scale.
Figure 9:
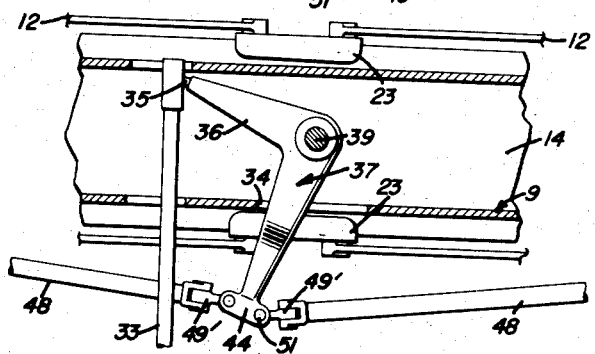
Figure 9 is a similar view taken on the line 9—9 of Figure 5.
Figure 10:
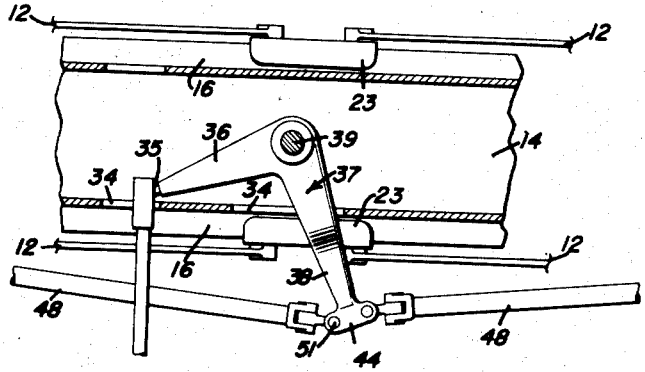
Figure 10 is another similar view taken on the line 10—10 of Figure 6.
Figure 7:
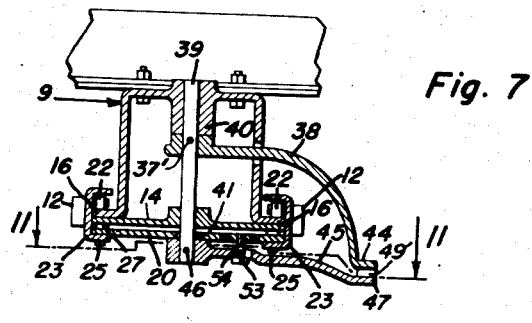
Figure 7 is a view in vertical transverse section taken on the line 7—7 of Figure 4 and drawn to a larger scale.

Referring to the drawings by numerals, wherein my invention has been illustrated as adapted for tilting the front steerable wheels 1 of an automobile through operation of conventional independent wheel suspensions, these wheel suspensions 2 being of the type comprising an upright arm 3 carrying the steering knuckle 4, a vertically swingable upper control arm 5 pivoted at its outer end, as at 6, to the upper end of said arm 3, and pivoted at its inner end, as at 7, to the hydraulic shock absorber 8 on the associated end of the hollow drop center front axle 9 which is supported at its ends on coil springs 10 supported on spring seats 11. The spring seats 11 are suitably mounted to the lower forked control arms 12 pivoted, as at 13, to the lower ends of the upright arms 3 for vertical swinging movement and extending inwardly in straddling relation to said axle bar 9. In this type of axle bar 9, a bottom closure plate 14 is suitably fixed to a lateral bottom edge flange 15 extending around said bar and forms with said flange parallel ledges 16 on the drop center of said bar at opposite sides thereof.

According to my invention, a rectangular coupling plate 20 is provided for the lower control arms 12 to extend under the drop center 21 of the front axle bar 9 and is supported on the ledges 16 by rollers 22 for movement along said ledges 16 and said front axle bar 9. The rollers 22 are mounted in a pair of opposite channeled side guides 23 on said plates 20 slidably fitting against the edges of the ledges 16 and bolted to said plate 20, as at 25, for assembly purposes. The inner ends of the lower control arms 12 are pivoted to said guides 23 at opposite ends of said guides, respectively, in straddling relation to the pair and to said axle bar 9 and by means of horizontal studs 26 extending laterally from said guides 23 at the ends thereof. Anti-friction roller bearings 27 seated in corner sockets 28 in said plate 20 and interposed between said plate and the bottom closure plate 14 run against said closure plate.

The coupling plate 20 is adapted to be moved from left to right from a normal central position by operation of the steering post 29 of the automobile, and concurrently with steering from left to right, by means of the mechanism now to be described.

The usual crank arm 30 operated through the well known worm drive, not shown, by the steering post 29 of the automobile, has pivoted thereto, as at 32, the rear end of a forwardly extending pitman rod 33. The front end of said rod 33 extends through a clearance opening 34 in the rear side of the front axle bar 9 and is suitably pivotally connected, as at 35, to one arm 36 of a horizontal bellcrank lever 37 fixed, in said axle bar 9, by a pin 37' to a vertical rock shaft 39 journaled at its upper end in a top bearing 40 in said axle bar 9 and also journaled through the before mentioned closure plate 14. The rock shaft 39 depends through said closure plate 14 and through a longitudinal slot 41 in the coupling plate 20, permitting sliding of said coupling plate 20 relative to said shaft. The other arm 38 of the bellcrank lever 37 extends rearwardly out of the front axle bar 9 through a suitable rear slot 43 therein and curves downwardly toward a coupling plate operating lever 45, presently described, said arm 38 terminating in a rear horizontal flat ear 44.

The coupling plate operating lever 45 is fixed by a pin 46 to the lower end of the rock shaft 39 to extend rearwardly therefrom and terminates in a flat horizontal ear 47 located beneath the ear 44. A pair of drag links 48 are operatively connected at outer ends thereof by knuckle joints 49 to the usual steering knuckle arms 50 and with inner ends connected to the ears 44, 47 by knuckle joint members 49' pivoted between said ears 44, 47 by vertical pivots 51 also connecting the bellcrank lever 37, and the coupling plate operating lever 45 together. As will now be seen, when the steering post 29 is turned in opposite directions, the pitman rod 33 will swing the bellcrank lever 37 in opposite directions to turn the steerable wheels 1 for right and left turning, and said lever 37 will swing the coupling plate operating lever 45 therewith. A stud bolt 53 depending from the coupling plate 20 through a longitudinal slot 54 in said lever 45 operatively connects the coupling plate operating lever 45 to the coupling plate 20 so that said plate is moved oppositely by swinging of said lever 45 in opposite directions. A series of bolt holes 56 are provided in the coupling plate 20 for selective turning of the stud bolt 53 therein to vary its position along said lever 45, whereby to vary the degree of movement of said coupling plate 20 under swinging of said lever 45, and for a purpose presently described.

Referring now to the operation of my invention, with the steerable wheels 1 straight for straight-ahead travel, as shown in Figures 1, 2, 3, 4, and 8, the coupling plate 20 is held by the bellcrank lever 37 and the coupling plate operating lever 45 in intermediate normal position on the ledges 16 on which said plate is centered between the spring suspensions 2 and whereby, through the lower control arms 12, the upright arms 3 of said suspensions are held in normal untilted positions. When the steering post 29 is operated to turn said steerable wheels 1 for making a right turn, as shown in Figure 5, the coupling plate 20 is moved toward the left along the ledges 16. Such movement of said coupling plate 20 then moves the lower control arms 12 toward the left and to cause, in corresponding degree, tilting of the upright arms 3 so that said wheels 1 are tilted from normal positions in the direction in which the turn is being made, as indicated by the broken lines a—a in Figure 5. When the steering post 29 is operated to turn said wheels 1 for a left turn, as shown in Figure 6, the mechanism operates oppositely than as described in the foregoing to cause said wheels 1 to be tilted vertically in the direction of the left turn, as indicated by the broken lines b—b in Figure 6. By selectively turning the stud bolt 53 in the bolt holes 56, the degree of tilting of said wheels 1 may be varied by varying the length of the lever arm operating against the coupling plate 20 upon operation of the coupling plate operating lever 45.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. The combination with an axle, independent wheel suspensions on said axle carrying steerable wheels and including upright members tiltable to tilt said wheels, control arms for said members, and steering mechanism for said wheels including a steering post operative in opposite directions, of means for tilting said upright members to tilt said wheels in the direction of steering including a slidable member mounted on and movable along said axle and connected to said control arms for operating the same to tilt said members, and direct operating linkage connections between said steering post and slidable member for moving said slidable member in opposite directions by operation of said steering post in opposite directions respectively.

2. The combination according to claim 1 wherein said slidable member comprises a plate to which said control arms are pivotally connected.

3. The combination according to claim 1 wherein said operating connections include a rock shaft on said axle, and a lever fast on said rock shaft, and an adjustable connection between said lever and slidable member for varying the leverage exerted against said slidable member.

4. The combination according to claim 1 wherein said operating connections comprise a rock shaft on said axle, a lever fast on said rock shaft and operatively connected to said slidable member, a second lever fast on said rock shaft, and a pitman rod connected to said second lever and operated by said steering post.

RICHARD O. VARNUM.

References Cited in the file of this patent

UNITED STATES PATENTS

| Number | Name | Date |
|---|---|---|
| 2,216,930 | Altemus | Oct. 8, 1940 |
| 2,260,102 | Freret | Oct. 21, 1941 |
| 2,271,505 | Kolbe | Jan. 27, 1942 |
| 2,280,044 | Kolbe | Apr. 14, 1942 |
| 2,341,726 | Kolbe | Feb. 15, 1944 |
| 2,349,175 | Kolbe | May 16, 1944 |